US006913169B2

(12) United States Patent
Lee

(10) Patent No.: US 6,913,169 B2
(45) Date of Patent: Jul. 5, 2005

(54) LOW PROFILE, FINE MIST, FINGER-OPERATED, PRECOMPRESSION-TYPE SPRAY PUMP

(75) Inventor: Chung Kee Lee, Seoul (KR)

(73) Assignee: Chong Woo Co., LTD, Ichon (KR)

( * ) Notice: Subject to any disclaimer, the term of this patent is extended or adjusted under 35 U.S.C. 154(b) by 55 days.

(21) Appl. No.: 10/681,050

(22) Filed: Oct. 7, 2003

(65) Prior Publication Data

US 2005/0045658 A1 Mar. 3, 2005

(30) Foreign Application Priority Data

Aug. 28, 2003 (KR) ...................... 10-2003-0059817

(51) Int. Cl.[7] ................................................ G01F 11/06

(52) U.S. Cl. ............................... 222/321.2; 222/321.9; 222/341

(58) Field of Search .......................... 222/321.1, 321.2, 222/321.7, 321.9, 340, 341, 383.1

(56) References Cited

U.S. PATENT DOCUMENTS

| | | | | |
|---|---|---|---|---|
| 3,865,313 A * | 2/1975 | Kondo | 239/333 |
| 4,065,038 A | 12/1977 | Magers et al. | 222/321 |
| 4,173,297 A | 11/1979 | Pettersen | 222/321 |
| 4,389,003 A | 6/1983 | Meshberg | 222/321 |
| 4,516,727 A * | 5/1985 | Saito et al. | 239/333 |
| 4,944,432 A | 7/1990 | Jouillat | 222/321 |
| 5,011,046 A * | 4/1991 | Graf et al. | 222/321.2 |
| 5,083,682 A * | 1/1992 | Cater | 222/321.2 |
| 5,096,097 A | 3/1992 | Lina | 222/385 |
| 5,234,135 A | 8/1993 | LaFosse et al. | 222/321 |
| 5,277,558 A | 1/1994 | Long | 417/481 |
| 5,277,559 A | 1/1994 | Schultz | 417/543 |
| 5,337,926 A * | 8/1994 | Drobish et al. | 222/309 |
| 5,482,188 A | 1/1996 | Lina | 222/321.2 |
| 5,803,318 A | 9/1998 | Lina | 222/321.2 |
| 6,209,759 B1 | 4/2001 | Hermouet et al. | 222/321.2 |

FOREIGN PATENT DOCUMENTS

| | | |
|---|---|---|
| EP | 0 757 004 A1 | 2/1997 |
| KR | 20-0204024 | 11/2000 |
| KR | 10-2002-0067623 | 11/2002 |
| WO | 02/33258 A1 | 4/2002 |

OTHER PUBLICATIONS

U.S. Appl. No. 10/275,152, filed Nov. 1, 2002, Lee.
U.S. Appl. No. 10/333,179, filed Sep. 29, 2003, Lee.

* cited by examiner

*Primary Examiner*—Joseph A. Kaufman
(74) *Attorney, Agent, or Firm*—Ladas & Parry LLP

(57) ABSTRACT

The present invention relates to a low profile, fine mist, finger-operated, precompression-type spray pump, and more particularly to a spray pump provided with a second valve of the novel structure being moveable between a poppet valve and a bottom entrance of housing, to precompress the fluid as a liquid content and then spray, whereby the spray pump can be operated even with a short travel distance of a piston, which enables to make the height of a push button spaced from a closure to be shorter than the existing ones, and the pumping process can be smoothly performed without leakage and can also be started with small empty pumping numbers. In addition, the spray pump according to the present invention is constructed with small numbers of constituent parts, resulting in the significant reduction of manufacturing cost and assembly cost.

5 Claims, 7 Drawing Sheets

(c)

(a)

(b)

LOW PROFILE, FINE MIST, FINGER-OPERATED, PRECOMPRESSION-TYPE SPRAY PUMP

FIELD OF THE INVENTION

The present invention relates to a low profile, fine mist, finger-operated, precompression-type spray pump, and more particularly to a spray pump provided with a second valve having a novel structure being moveable between a poppet valve and a bottom entrance of a housing, to precompress a liquid to be sprayed, whereby the spray pump can be operated even with a short travel distance of a piston, which enables the height of a push button spaced from a closure to be shorter than in existing spray pumps, and the pumping process to be smoothly performed without causing dripping of the liquid at a nozzle and to be initiated with a small number of pumping actions under the condition that the housing is empty ("empty pumping number"). In addition, the spray pump according to the present invention is constructed with a small number of constituent parts, resulting in the significant reduction of its manufacturing cost and assembly cost.

Spray pumps which nebulize a liquid sealed in a container, that is, dispense it in the form of very small droplets through a nozzle in response to a user's pressing a push button provided at the upper part of a pump, are widely used due to many merits thereof. These pumps have been developed to have various configurations depending upon the characteristics of the liquid to be nebulized. (e.g., the viscosity of fluid), the amount of liquid to be pumped, etc.

Generally, the spray pumps nebulizing a liquid of low viscosity comprise: a closure holding the pump securely to the neck of a container, a housing guiding the flow of fluid, said housing being engaged to the closure and having a smaller diameter at its lower portion than at its upper portion; a piston being moveable coaxially within the housing, said piston having formed therein a vertical duct penetrating vertically; a poppet valve closing and opening the vertical duct of the piston by a rod, said rod being formed at the upper portion of the poppet valve; a spring providing an upward returning force to the piston or poppet valve; and a push button being mounted on the upper portion of the piston, said push button being provided with a nozzle at its lateral portion which communicates with the vertical duct.

Accordingly, when the push button is pressed so as to spray the fluid (i.e., a downward force is applied to the push button), the fluid present in the housing is pressurized to rise along the vertical duct and then spray through the nozzle. On the other hand, when the downward force having been applied to the push button is released, the vertical duct is closed by the rod of the poppet valve, and the inner pressure of housing drops while the piston moves upward, whereby the fluid present in the container enters the housing to compensate the reduced pressure thereof.

Various configurations of spray pumps have been developed whereby the pumping of fluid can be carried out by closing and opening the bottom entrance of a housing (hereafter, sometimes referred to as "a housing bottom entrance") to vary the pressure in the interior of the housing (hereinafter, sometimes referred to as the "housing interior"). As a closing/opening means of the housing bottom entrance during pumping, a metal ball is generally used. However, the metal ball fails to entirely close the housing bottom entrance because of its spherical shape. Furthermore, the metal ball cannot rapidly respond to the variation of pressure of the housing's interior, resulting in leakage by dripping at the nozzle, characterized by the leakage of some fluid owing to a small gap between the metal ball and the housing bottom entrance and hence the slow loss of pressure from the housing's interior. In addition, the metal ball acts to close the housing bottom entrance by gravity upon application of a downward force to the push button, and open it in response to loss of pressure in the housing's interior upon release of the downward force; however, the density of fluid present in the housing's interior increases upon application of the downward force to the push button and thus the relative gravity of the metal ball decreases, making the rapid closing of housing bottom entrance difficult. Therefore, owing to the pressure loss in the housing's interior and the slow response to the variation of pressure, a leakage by dripping occurs at the initial step and final step of a spraying procedure.

In order to solve these problems, spray pumps of various configurations have been developed which can precompress the fluid present in a housing during pumping. In such precompression-type spray pumps, the point of contact between a rod of a poppet valve and a vertical duct of a piston opens for a short time to enable spraying, only when the pressure of the fluid present in the housing's interior reaches a certain level, namely, the threshold pressure, upon application of a downward force to the push button, and then rapidly closes after completion of the spraying.

Examples of such precompression-type spray pumps include a spray pump disclosed in U.S. Pat. No. 5,277,559 in which a sliding seal is hold moveable on a poppet valve, a spray pump disclosed in Korean patent application No. 2002-67623 to the present applicant, in which two springs are provided, a spray pump disclosed in Korean registered utility model No. 204024 to the present applicant, in which two metal balls are provided, and a spray pump disclosed in U.S. Pat. No. 5,096,097 in which a second cylinder extends upwardly from a housing bottom entrance. These spray pumps have some technical merits, respectively, but also have demerits as described herein below.

The spray pump in U.S. Pat. No. 5,277,558 has a demerit that the sliding seal being moveable along the outer surface of a poppet valve must be molded with high precision, or else will malfunction. The spray pump in Korean patent application No. 2002-67623 and the spray pump in Korean registered utility model No. 204024 exhibit an excellent precompression function but have demerits of relatively high manufacturing cost due to the use of numerous parts. The spray pump in U.S. Pat. No. 5,096,097 has a demerit that a housing of relatively large size is required to provide the variable volume sufficient for compression of the fluid with the housing's interior, thereby needing a piston able to travel a large distance.

In recent, there has been a great demand for a spray pump which exhibits a high performance and also, when mounted on a container, does not render a final product unattractive. When a spray pump is mounted on a container, portions exposed outside are a push button and a closure. A large-sized push button or closure are likely to be perceived as unattractive on a final product and hence, from this viewpoint, a button and closure of small size are required. Meanwhile, the variable volume of a housing's interior and the travel distance of a piston must be sufficiently large to attain the desired pumped volume of fluid. The variable volume of a housing's interior is determined by the length and width of the housing and, considering the whole dimension of a pump to be mounted on a container, there is a certain it to the length and width of the housing. Where the lengths and widths of housings are the same in two spray pumps, the volume of fluid pumped depends upon the travel distance of the piston. When it is required to make the travel distance of piston to be long, the length of button or closure, more specifically, the height of button spaced from the closure, must be large, thereby remarkably degrading the appearance of a final product as stated above. Accordingly, a spray pump is required which operates based on a short travel distance of the piston, and ultimately a short height of the button spaced from the closure.

In addition, it is desirable that the number of pumping actions to be performed to effect a first spraying under the condition that the housing's interior is empty ("empty pumping number"), be minimized to in convenience of use, especially in the case of certain pharmaceutical products which should not be held for a long time in the housing's interior.

SUMMARY OF THE INVENTION

The purpose of the present invention is therefore to eliminate the drawbacks of the prior arts and to satisfy the requirements mentioned above.

More specifically, the object of the invention is to provide a spray pump which can operate even with a short travel distance of a piston, allowing the height of a button spaced from a closure to be small, and which enables the pumping procedure to be performed smoothly without causing leakage by dripping at the nozzle, and which can be constructed with a small number of constituent parts, thereby significantly reducing its manufacturing cost and assembly cost, and which can also start spraying with a low empty pumping number.

In order to attain this object, the low profile, fine mist, finger-operated, precompression-type spray pump according to the present invention comprises:

a closure holding a pump securely to the neck of a container;

a housing guiding the flow of a liquid to be sprayed, said housing being constructed as a multi-step structure, with the diameter thereof reducing downwardly;

a piston being moveable in both upward and downward directions within the housing, said piston being provided with a vertical duct penetrating therethrough;

a poppet valve closing and opening the vertical duct of piston by a rod, said poppet valve being provided with the rod at the upper portion thereof and a cylindrical part extending from the lower portion thereof;

a spring providing an upward returning force to the poppet valve;

a push button being engaged to the top of the piston, said push button being provided with a nozzle at its lateral portion which communicates with the vertical duct; and a second valve closing a housing bottom entrance with a glans part in compression mode and opening it in release mode, said second valve being disposed between the poppet valve and the housing bottom entrance, in which said second valve is provided with a cylindrical body being moveable coaxially within the cylindrical extending part of the poppet valve and the glans part has a larger diameter than the cylindrical body part, said glans part being positioned at the lower portion of the cylindrical body.

"Compression mode" in the present invention means an operating state wherein, by applying a downward force to the push button, the housing bottom entrance is closed and the piston moves downward and, more specifically, includes a "precompression mode" wherein the housing bottom entrance is closed by the glans part of the second valve and the fluid present in the housing's interior is compressed, and a "spray mode" wherein, when the pressure of fluid in the housing's interior reaches a certain level, namely, the threshold pressure, the vertical duct is opened and thus the fluid present in the housing's interior is sprayed through a nozzle.

"Release mode" in the present invention means an operating state wherein, by releasing the downward force having been applied to the push button, the housing bottom entrance is opened from the glans part of the second valve and, more specifically, includes an "inflow mode" wherein while the piston moves upward by the upward returning force of the spring, the fluid present in the container is introduced into the housing's interior through the housing bottom entrance, and a "rest mode" wherein the piston is positioned at the apex of its stroke and thus no longer moves upward. Therefore, the pumping procedure of the spray pump according to the present invention is performed with one cycle of "rest mode→precompression mode→spray mode→inflow mode."

In the spray pump of the present invention, the second valve acts to close and open the housing bottom entrance with its glans part in the pumping procedure, allowing the fluid to be introduced into the housing's interior and the introduced fluid to be precompressed and then sprayed. More specifically, while the upper portion of second valve, i.e., the cylindrical body, is in moveable contact with the cylindrical extending part of the poppet valve such that the outer surface of cylindrical body slides upward and downward along the inner surface of cylindrical extending part, the lower portion of second valve, i.e., the glans part, closes and opens the housing bottom entrance.

Since the second valve is made of plastic material, like the housing, when the glans of the second valve comes into contact with the housing bottom entrance, the contact sealing effect is excellent, allowing almost no pressure loss in the housing's interior during the pumping procedure, compared to using a metal ball as an opening-closing means as in the prior art, which contributes to the prevention of leakage by dripping. Moreover, in the compression mode, as the poppet valve moves downward, the cylindrical body of the poppet valve being in contact with the cylindrical extending part of the poppet valve is also dragged downward, thereby the housing bottom entrance being immediately closed by the glans part of the second valve. In the release mode, as the poppet valve returns upward by an upward returning force of the spring, the housing bottom entrance is immediately opened in the same manner. Accordingly, when the pump is operated, the response speed of the glans part for closing and opening the housing bottom entrance is very fast. Due to this feature, the spray pump according to the present invention can have a relatively larger, variable volume in the same housing interior as that used in the prior art, thus pumping can be performed even with a short travel distance of the piston, which makes it possible to shorten the height of the push button spaced from the closure, and also reduce the empty pumping number.

In a preferable embodiment of the present invention, the top of the housing bottom entrance is formed to be concave in shape, and the bottom of the glans part of the second valve is formed to be convex in shape, enabling them to come into close contact with each other. Accordingly, when the second valve descends to close the housing bottom entrance in the pumping procedure, the convex portion of the glans part perfectly occludes the concave portion of the housing bottom entrance, thereby exhibiting a high sealing effect.

In another preferable embodiment of the present invention, a plurality of teeth are circumferentially formed on the outer surface of glans part of the second valve, and a plurality of grooves corresponding to the teeth are circumferentially formed on the inner surface of the housing in proximity to the housing bottom entrance, and when the teeth are engaged to the grooves, a plurality of through passages are created between them. Accordingly, the upward and downward movement of the second valve can be stably performed by the integration of these teeth and grooves, resulting in a smoother pumping action.

In another preferable embodiment of the present invention, an annular protuberance is formed on the outer surface of cylindrical body of the second valve and/or the inner surface of cylindrical extending part of the poppet valve at a position where the cylindrical body is in moveable contact with the cylindrical extending part, resulting in a further improved sealing effect

DESIGNATION OF THE REFERENCE NUMERALS

Figure 1A:
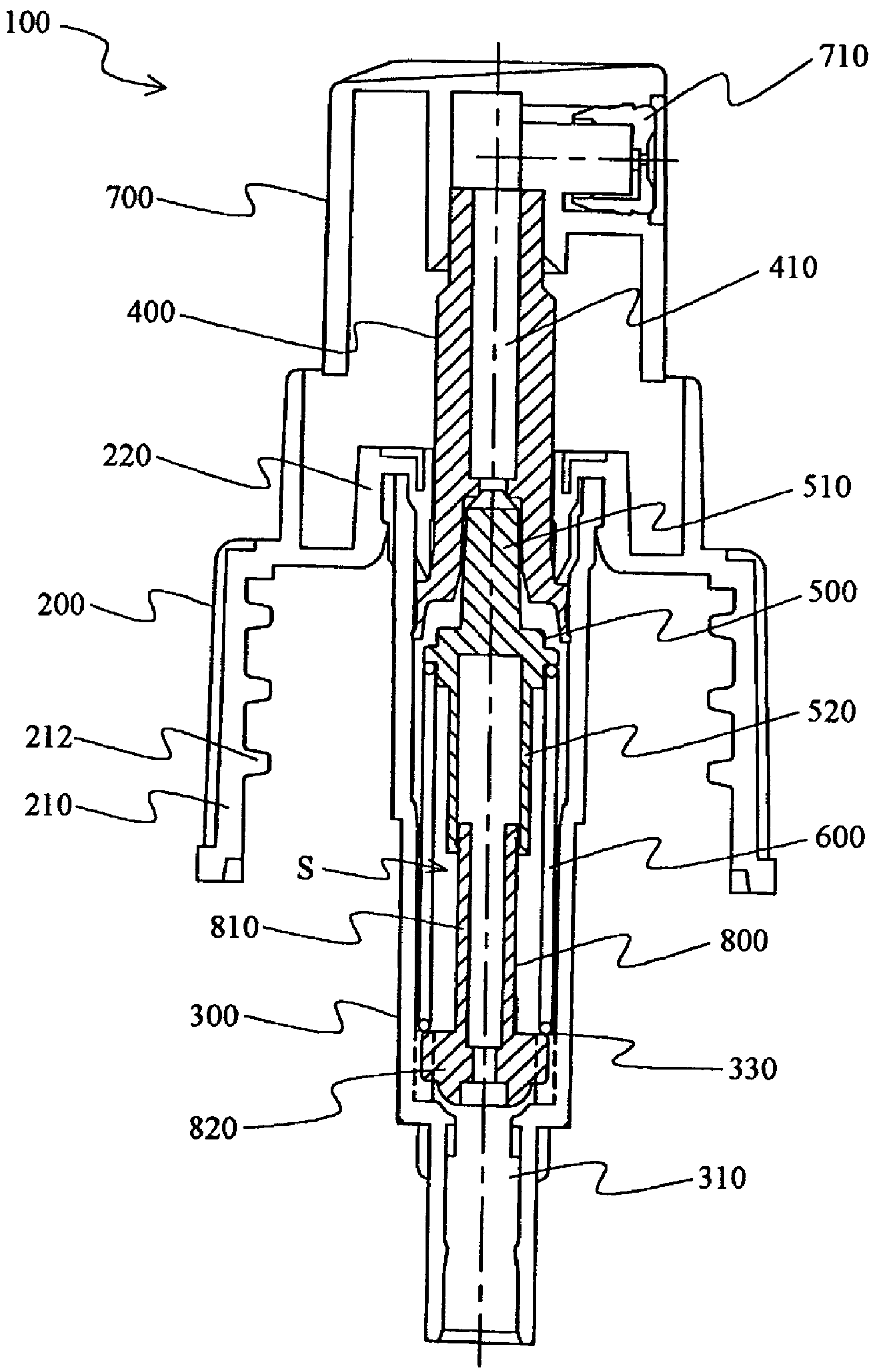
FIG. 1A shows a longitudinal section view of the spray pump according to an embodiment of the present invention being in rest mode.

100: spray pump
200: closure
300: housing
400: piston
500: poppet valve
600: spring
700: push button
800: second valve

DETAILED DESCRIPTION OF PREFERRED EMBODIMENTS

As shown below, the description refers to the relevant drawings in order to describe the present invention more clearly, and such description is not to be interpreted as limiting the present invention in any way.

Figure 1B:
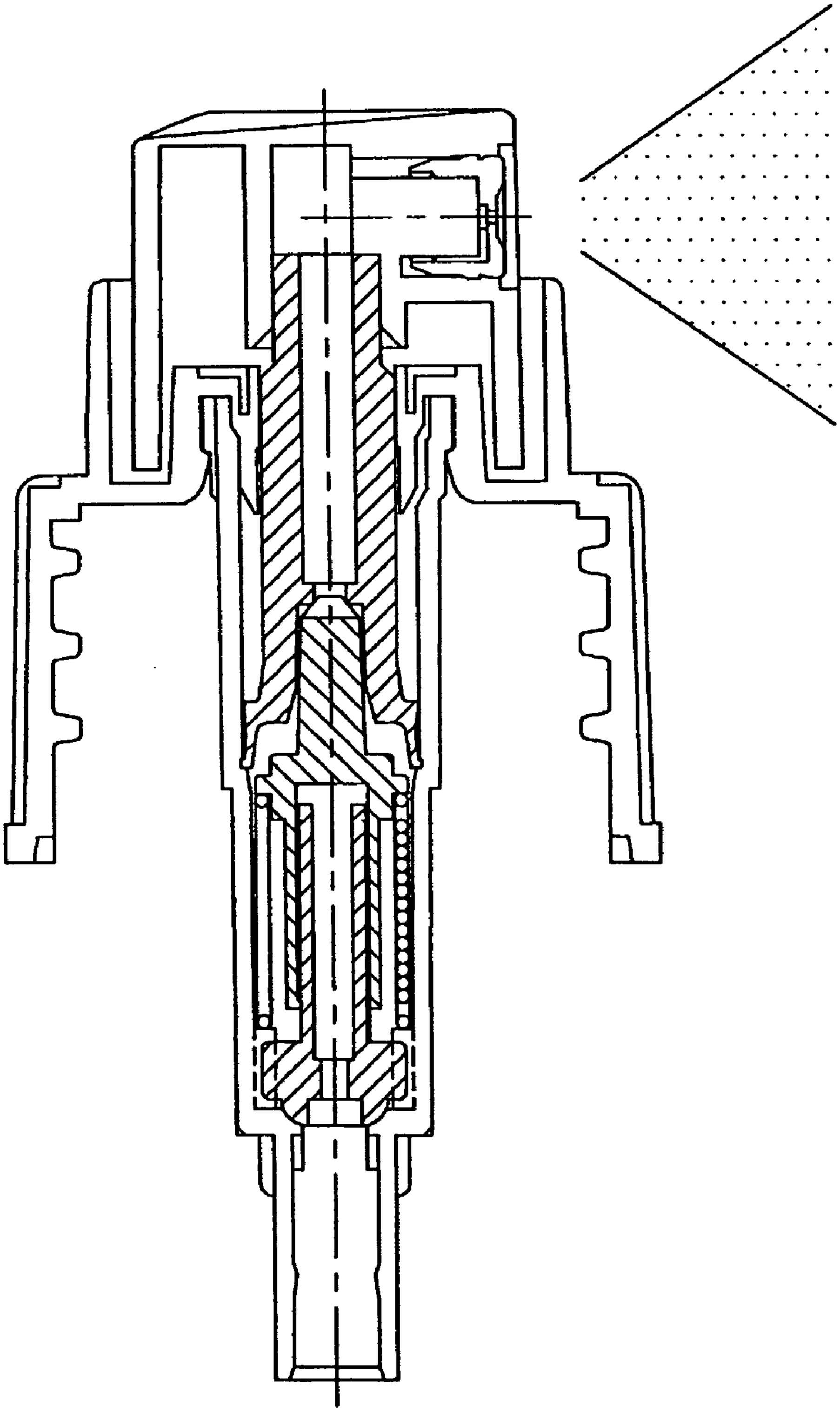
FIG. 1B shows a longitudinal section view of the spray pump of FIG. 1A being in spray mode.

FIG. 1A shows the longitudinal section view of a spray pump according to one embodiment of the present invention being in the release mode (more particularly, rest mode), and FIG. 1B shows the longitudinal section view of the spray pump being in the compression mode (more particularly, spray mode).

Referring to FIG. 1A, a spray pump 100 comprises, a closure 200 for securely holding the pump 100 to the neck of a container (not shown); a housing 300 for guiding the flow of the fluid to be sprayed, and which is configured as a multi-step structure; a piston 400 being moveable upwardly and downwardly along the inner surface of the housing 300, and which has a vertical duct 410 formed along the central axis thereof; a poppet valve 500 for closing and opening the vertical duct 410 with a rod 510, which has the rod 510 as an upper portion thereof and a cylindrical extending part 520 as a lower portion thereof; a spring 600 for providing an upward returning force to the poppet valve 500; a push button 700 engaged to the top of the piston 400 and having a nozzle 710, formed at its later side, being in communication with the vertical duct 410; and a second valve 800 for closing and opening a bottom entrance 310 of the housing 300 with a glans part 820, and which is disposed between the poppet valve 500 and the housing bottom entrance 310.

A cylindrical sleeve 210 of a closure 200 is screwed by a thread 212 formed thereon to the threaded neck of a container. A lateral part 220 horizontally extending from the sleeve 210 is resiliently bent such that it is held fast to the top of the housing 300 while being in sliding contact with the piston 400. Such structural characteristics of the lateral part 220 are described in the PCT international patent application No. WO 02/33258 to the present applicant, which is incorporated into the present invention as a reference.

Figure 4:
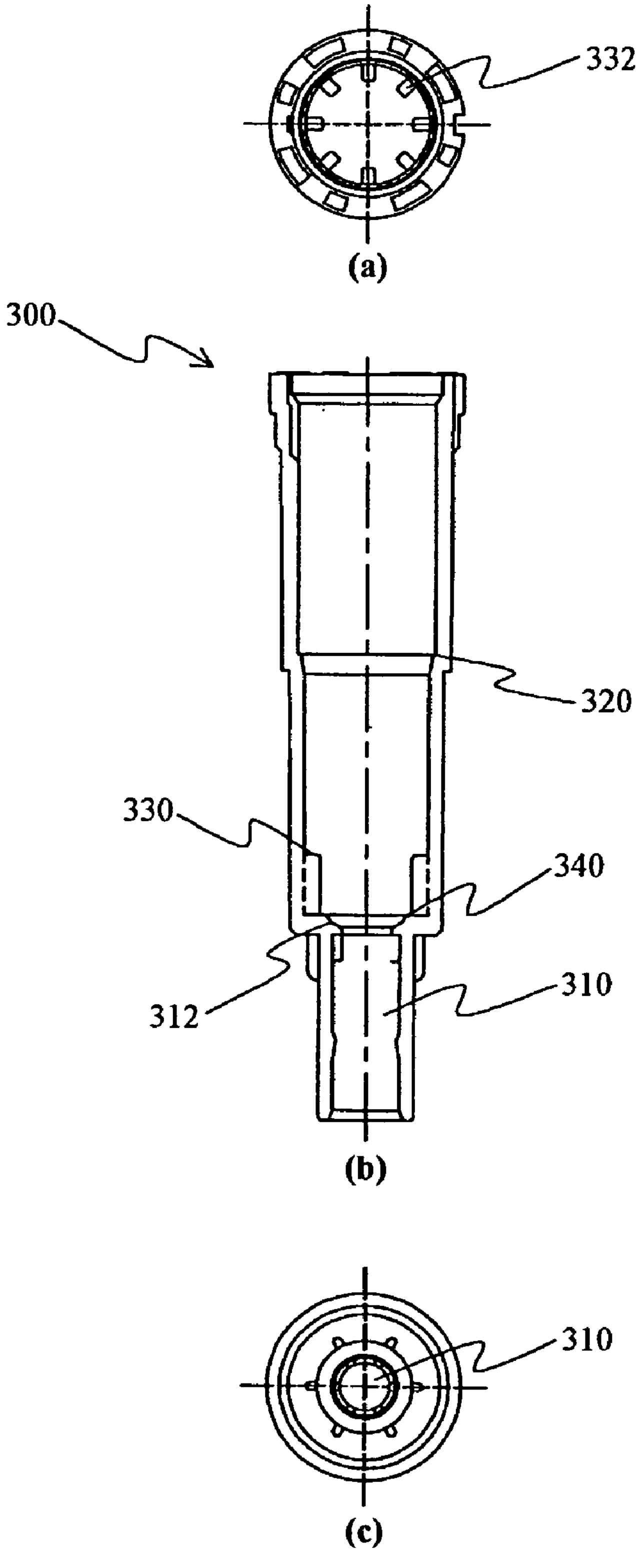
FIG. 4 shows a top view (a), a longitudinal section view (b), and a bottom view (c) of a housing used in the spray pump according to an embodiment of the present invention.

A housing 300 is configured as a multi-step structure with its diameter decreasing downwardly by steps. In the bottom entrance 310 of the housing 300 is inserted a suction tube (not shown), which is immersed in the fluid to be nebulized. The housing 300 is illustrated in more detail, referring to FIG. 4 showing a top view (a), a vertical cross-sectional view (b) and a bottom view (c) thereof. In the housing 300 of the multi-step structure, a first step 320 is formed, as shown in FIG. 1B, at the position where a piston 400 no longer moves downward in the compression mode, and a second step 330 is formed, as shown in FIGS. 1A and 1B, at the position where a spring 600 is located, and a third step 340 is formed at the position where the second valve 800 closes and opens the housing bottom entrance 310 with the glans part 320 thereof.

As can be seen in the top view (a) of FIG. 4, the second step 330 is formed with a plurality of grooves 332. The bottom of the spring 600 abuts against the top of these grooves 332. The glans part 820 of the second valve 800 is also disposed at the second step 330. As will be described later, when teeth 822 of the glans part 820 (FIG. 6) are engaged to the grooves 332 of the second step 330, a plurality of through passages are created between the teeth 822 and grooves 332, through which the fluid present in a container is introduced into the housing's interior (S) in the inflow mode. The dimensions of the through passage are not particularly limited but, in consideration of rheological properties such as the viscosity of fluid, the volume of fluid to be pumped, etc., such dimensions can be determined by controlling the size, number and spacing of the grooves 332 and the teeth 822.

Again referring to FIG. 1A, the piston 400 is moveable upwardly and downwardly along the inner surface of the housing 300 under the sealing condition. The bottom of the vertical duct 410, with which the rod 510 of the poppet valve 500 are in contact, is configured to have a narrow width to provide a high sealing effect in the precompression mode.

Figure 5:
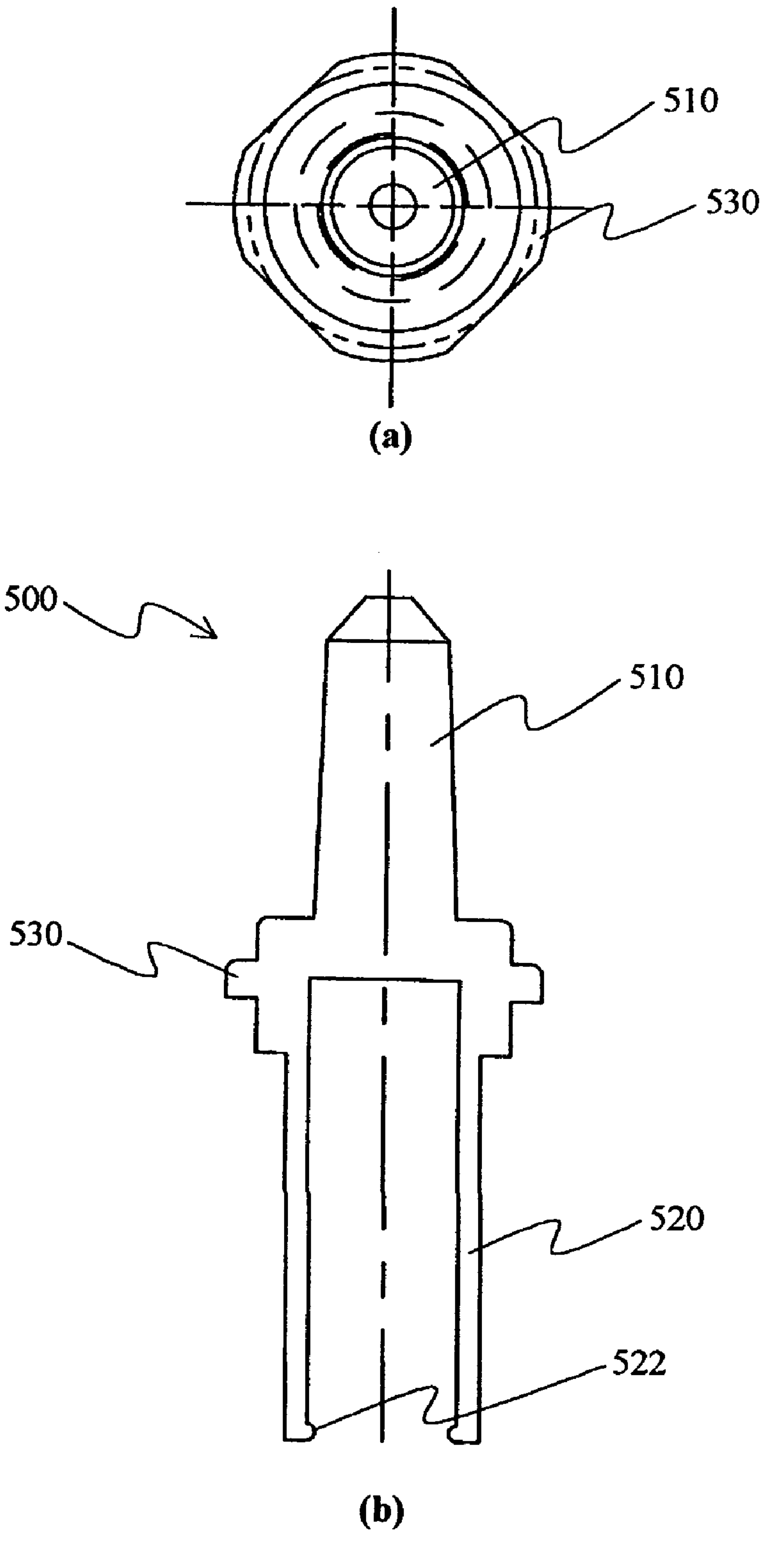
FIG. 5 shows a top view (a) and a longitudinal section view (b) of a poppet valve used in the spray pump according to an embodiment of the present invention.

The poppet valve 500 is illustrated referring to FIG. 5, showing a top view (a) and a vertical cross-sectional view (b) thereof, and is moveable upwardly and downwardly together with the piston 400 in all the operation modes except the spray mode. Referring to the vertical cross-sectional view (b) of FIG. 5, the poppet valve 500 comprises the rod 510 of the upper portion, a supporting part 530 of the middle portion, and the cylindrical extending part 520 of the lower portion. As stated previously, the rod 510 acts to close and open the bottom of the vertical duct 410 of the piston 400. For easy closing, the top of the rod 510 is preferably conical in shape. The supporting part 520 has a larger diameter than the rod and the cylindrical extending part 520, and the top of the spring 600 abuts against the lower portion of the supporting part 520. The side of the supporting part 520, as shown in FIG. 5A, is symmetrically cut such that the spaced distance thereof from the inner surface of housing 300 becomes larger to allow the fluid to rise more smoothly. The cylindrical extending part 520 is formed such that the cylindrical body 810 of the second valve 800 moves upwardly and downwardly along the inner surface thereof. For ensuring resilient contact with the cylindrical body 810, an annular protuberance 522 protrudes inwardly at the bottom of the cylindrical extending part 520. In another embodiment, the annular protuberance may be formed outwardly at the top of the cylindrical body 810, or the annular protuberances may be formed both inwardly at the bottom of the cylindrical extending part 520 and outwardly at the top of the cylindrical body 810, respectively.

Again referring to FIG. 1A, the spring 600 is positioned between the second step 330 of the housing 300 and the poppet valve 500, providing an upward returning force to the poppet valve 500 via the supporting part 530.

Figure 6:
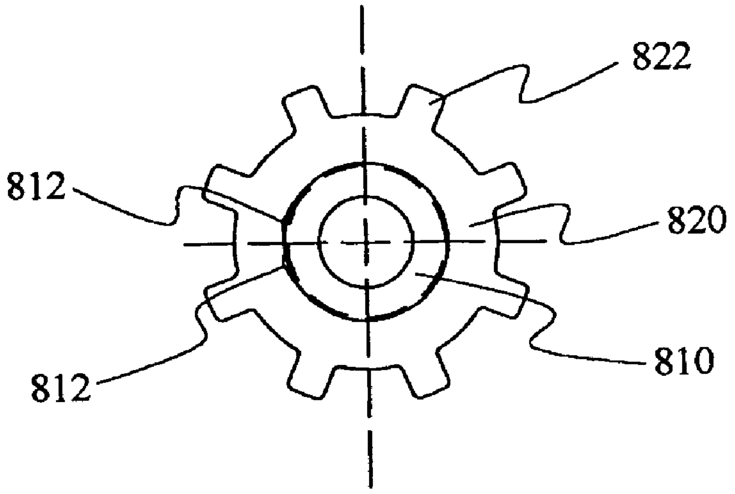
FIG. 6 shows a top view (a) and a longitudinal section view (b) of a second valve used in the spray pump according to an embodiment of the present invention.
Figure 6:
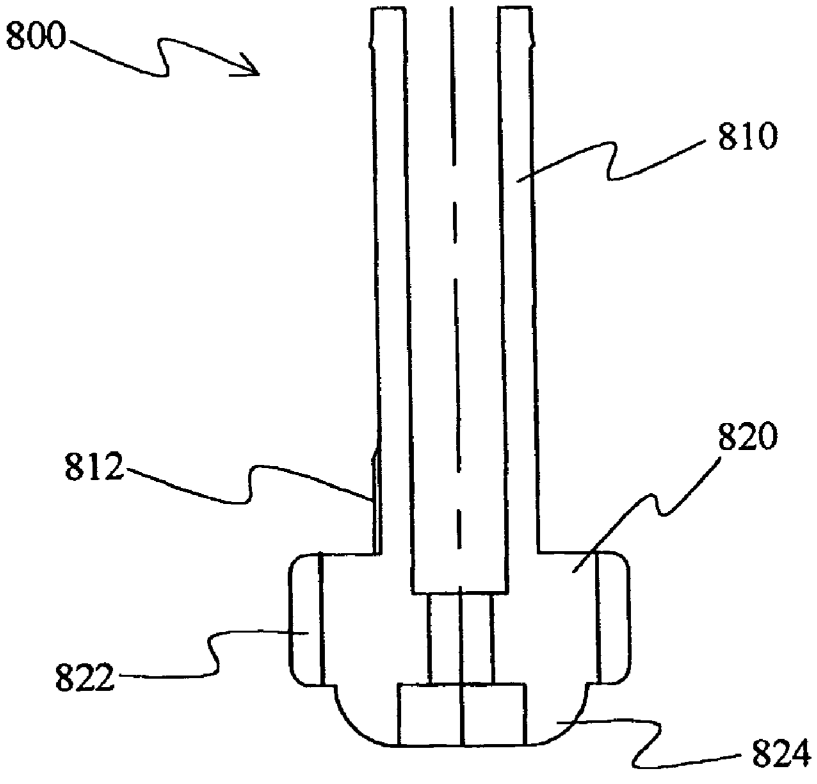

The second valve 800, disposed between the poppet valve 500 and the housing bottom entrance 310, is illustrated referring to FIG. 6 showing a top view (a) and a vertical cross-sectional view (b) thereof. Referring to the vertical cross-sectional view (b) of FIG. 6, the second valve 800 comprises the cylindrical body 810 of the upper portion and the glans part 820 of the lower portion, the glans part 820 having a larger diameter than the cylindrical body 810. The cylindrical body 810 is moveable upwardly and downwardly along the inner surface of the cylindrical extending part 520 of the poppet valve 500. In order for the body 810 to smoothly move within the extending part 520 while retaining the sealing condition, the outer diameter of the body 810 is formed to be slightly smaller than the inner diameter of the extending part 520 and simultaneously slightly larger than the inner diameter of the annular protuberance 522. Since the extending part 520 is of resilient plastic material, the sealed state can be maintained between the extending part 520 and body 810 in the pumping procedure, and also the upward and downward movement thereof can be smoothly carried out. Moreover, a pair of small lugs 812 is formed on the outer surface of the body 810 in proximity to the glans part 820. As will be illustrated later concerning the operation of pump 100, when the poppet valve 500 descends and thus the fluid present in the housing's interior (A) is precompressed and sprayed in the compression mode, the cylindrical extending part 520 of the poppet valve 500 reaches the small lugs 812 of the second valve 800 at the time of completion of spraying and passes them in the continuous descent thereof, whereby the cylindrical extending part 520 is slightly separated from the body 812, and then the pressurized fluid present in the housing's interior (S) is discharged though the separating gap toward the container.

The detailed description of this procedure will be illustrated later with reference to the operation of the pump 100.

Meanwhile, on the side surface of the glans part 820, a plurality of teeth 822 are circumferentially formed. The teeth 822, as stated previously, are engaged to the inner portion of housing 300 next to the housing bottom entrance 310, i.e., to the grooves 322 of the second step 330 of the housing 300. Accordingly, the upward and downward movement of the second valve 800 can be further stabilized by the coaxially-moveable engagement of the teeth 822 and grooves 332. Furthermore, the bottom 824 of the glans part 820 is formed to be convex in shape, and the top 312 of the housing bottom entrance 310 corresponding thereto is concave. Therefore, when the glans part 820 closes the housing bottom entrance 310, the sealing effect can be improved by the close contact between the two bodies.

Referring to FIGS. 1A, 1B, 2 and 3, the operation of the spray pump 100 according to the present invention is described hereafter. FIGS. 1A and 1B show the spray pump 100 in the rest mode and the spray mode, respectively.

In the rest mode of FIG. 1A, as no external force is applied to the push button 700 of the pump 100, the rod 510 of the poppet valve 500 closes the vertical duct 410 of the piston 400 by an upward returning force of the spring 600. The glans part 820 of the second valve 800 is separated from the housing bottom entrance 310 to open the housing bottom entrance 310. In some cases, the glans part 820 may close the housing bottom entrance 310 by the weight of the fluid present in the housing's interior (S).

As a downward force is applied to the pump 100 being in the rest mode by pressing the push button 700, the piston 400 and poppet valve 500 are actuated, with the vertical duct 410 being closed by the rod 510. At this time, the housing bottom entrance 310 is immediately closed by the descending glans part 310, because the second valve 800, of which the cylindrical body 810 is in contact with the cylindrical extending part 520 of the poppet valve 500, descends together with the poppet valve 500 due to its frictional contact with the poppet valve 500. As such, the spray pump 100 according to the present invention exhibits a rapid response to the application of external force in the compression mode. As the housing bottom entrance 310 is closed by the glans part 820, the housing's interior (S) is wholly sealed. As the piston 400 continues to descend under this sealing condition, the cylindrical extending part 520 of the poppet valve 500 moves downward, with its inner surface being in contact with the outer surface of the body 810 of the second valve 800, whereby the fluid present in the housing's interior (S) is pressurized. By this pressurization, the fluid can be precompressed until reaching a certain level, namely the threshold pressure, prior to spraying, thus the spraying procedure can be performed at a moment of reaching the threshold pressure, without leakage by dripping.

Figure 2:
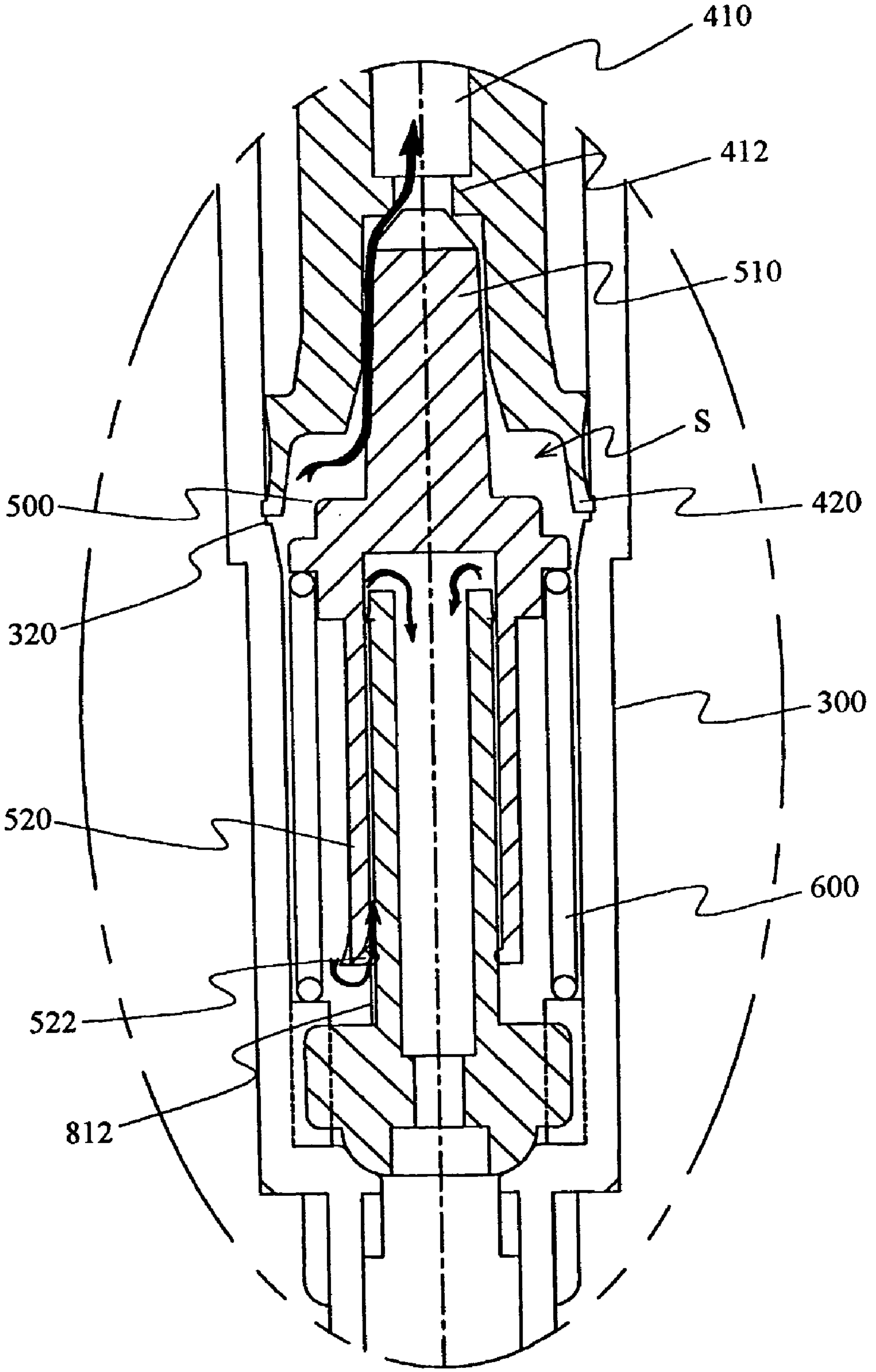
FIG. 2 shows in enlarged scale a longitudinal section view of a part of the spray pump of FIG. 1A, showing operation of some constituent parts being in spray mode.

Accordingly, by continuous precompression, when the pressure of the fluid present in the housing's interior (S) reaches the extent of being able to overcome the compression force of the spring 600, as mentioned above, spraying occurs as shown in FIG. 1B. The working conditions of some constituent parts of the pump 100 being in the spray mode are illustrated in more detail in FIG. 2. Referring to FIG. 2, the rod 510 is separated from the bottom entrance 412 of the vertical duct 410, and the pressurized fluid rises toward the vertical duct 410 through the generated gap. This spraying procedure occurs in an instant, and the pressure of the housing's interior (S) drops rapidly below the threshold pressure for spraying because of the discharge of the fluid toward the vertical duct 410, whereby the vertical duct 410, more specifically, the bottom entrance thereof, is again closed by the rod 510.

Even after spraying, the distal portion 420 of the piston 400 continues to descend until reaching a first step 320 of the housing 300, with the vertical duct 410 being closed by the rod 510. As a consequence, the residual fluid remaining in the housing's interior (S) is again pressurized but the pressure is not increased sufficiently to cause another discharge of spray. This residual pressure is not preferred when the fluid present in the container is introduced into the housing's interior (S) in the following release mode, which will be illustrated later in more detail.

Figure 3:
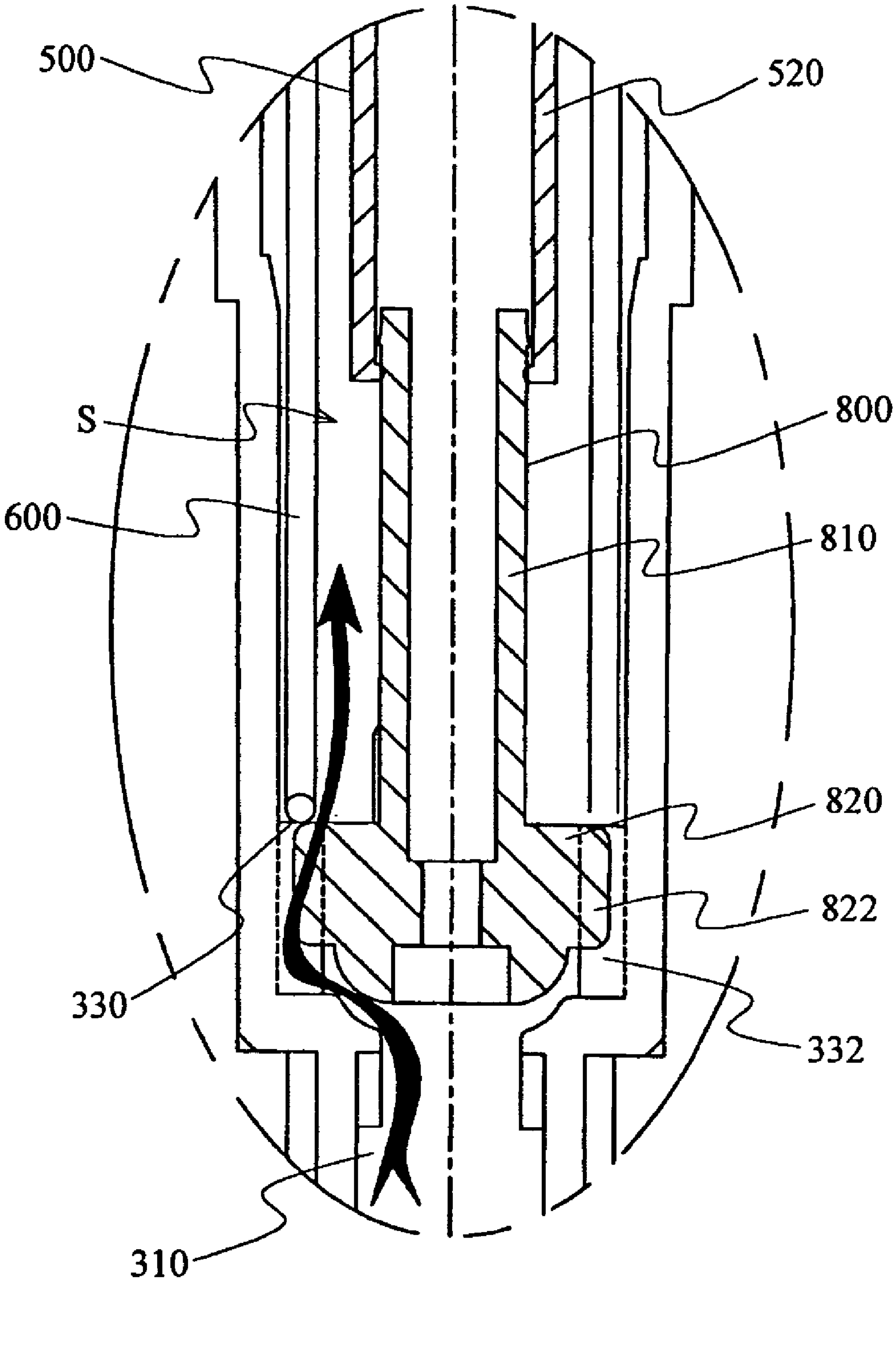
FIG. 3 shows in enlarged scale a longitudinal section view of a part of the spray pump of FIG. A, showing operation of some constituent parts being in inflow mode.

As the downward force having been applied to the push button 200 is released, the poppet valve 500, as shown in FIG. 3, moves upward by an upward returning force of the spring 600. Since the body 810 of the second valve 800 is in frictional contact with the extending part 520 of the poppet valve 500, the second valve 800 also rises together with the poppet valve 500 by the frictional contact therebetween, whereby the housing bottom entrance 310 is opened immediately after the poppet valve 500 starts to move upward. When the glans part 820 of the second valve 800, more particularly, the teeth 822, reaches the bottom of spring 600, the second valve 800 no longer moves upward and only the poppet valve 500 rises. Since the poppet valve 500 rises with its extending part 520 being in sealing contact with the body 810 of the second valve 800, the volume of the housing's interior (S) increases, whereby the fluid present in the container is introduced into the housing's interior (S) through a through passage 332 between a second step 330 and the glans part 820 so as to compensate the reduced pressure in the housing's interior (S) (as shown schematically by the flow lines in FIG. 3).

As stated previously, the residual pressure in the housing's interior (S), having been generated after spraying in the compression mode, remarkably reduces the driving force for the inflow of fluid into the housing's interior (S). Meanwhile, bubbles remaining in the housing's interior (S) after spraying are accumulated by continuous pumping, causing an air cushion phenomenon. Accordingly, it is desirable to reduce the pressure of the housing's interior (S) and remove the bubbles by discharging the fluid toward the container after spraying. In the spray pump 100 according to the present invention, since a pair of small lugs 812 are formed on the outer surface of the body 810 of the second valve 800 at the height where the annular protuberance 522 of the extending part 520 of the poppet valve 500 is positioned immediately after spraying, as shown in FIG. 6B, the annular protuberance 522 passes over the small lugs 812 as the extending part 520 descends, as shown in FIG. 2, whereby the fluid present in the housing's interior (S) is discharged toward the container through the gap generated between the lugs 812. For convenience of illustration, FIG. 2 is depicted so that the flow of the fluid for upward spraying (as shown schematically by the large flow line) and the flow of the fluid for downward discharging (as shown schematically by the small flow lines) occur simultaneously; however, the height of positioning the small lugs 812 on the outer surface of the body 810 is preferably adjusted such that the downward discharging occurs immediately after completion of the upward spraying.

Again referring to FIG. 3, the inflow of fluid into the housing's interior (S) in the release mode is performed immediately after the piston 400 begins to rise. To the contrary, in the spray pump of U.S. Pat. No. 5,096,097 wherein a second cylinder extends upwardly from the housing bottom entrance, the inflow of fluid into the housing's interior can start only when an extending part of a poppet valve separates from the top of a second cylinder by the continuous rising of a piston. Therefore, in the spray pump of this type, where a considerable pressure remains in a housing's interior, for example, the complete spraying has been not accomplished, it is difficult for the fluid to be introduced into the housing's interior, unless a sufficient variable volume is guaranteed in the housing's interior. To ensure the sufficient variable volume, the spray pump of this type requires a long upward and downward travel distance of the piston if the height and width of housing is limited, which necessitates a great height of a push button spaced from a closure. Compared to this existing spray pump, the spray pump according to the present invention can provide a relatively large variable volume in the housing's interior, even with a short travel distance of the piston in the case of the same spraying amount, due to the rapid response of the variable volume upon application or release of the external force. Such rapid response also contributes to the reduction of the empty pumping number.

INDUSTRIAL APPLICABILITY

As described above, the low profile, fine mist finger-operated, precompression-type spray pump according to the present invention can be operated even with a short travel distance of its piston, thus it is possible to reduce the height of a push button spaced from a closure, which contributes to the beauty of a final product containing liquid to be sprayed, on which the spray pump is mounted. The spray pump according to the present invention can be smoothly pumped without leakage and also fabricated with a small number of constituent parts, resulting in the remarkable reduction of its manufacturing cost and assembly cost. In addition, it can start to pump with a small empty pumping number.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A low profile, fine mist, finger-operated, precompression-type spray pump for the nebulization of fluids, comprising:

- a closure holding a pump securely to the neck of a container;
- a housing guiding the flow of a fluid to be sprayed, said housing being constructed as a multi-step structure, with the diameter thereof reducing downwardly by steps;
- a piston being moveable in both upward and downward directions within the housing, said piston being provided with a vertical duct penetrating therethrough;
- a poppet valve closing and opening the vertical duct of the piston with a rod, said poppet valve being provided with the rod at the upper portion thereof and a cylindrical extending part at the lower portion thereof;
- a spring providing an upward returning force to the poppet valve;

a push button being engaged to the top of the piston, said push button being provided with a nozzle at its lateral portion, said nozzle communicating with the vertical duct; and a second valve closing a housing bottom entrance with a glans part in compression mode and opening it in release mode, said second valve being disposed between the poppet valve and the housing bottom entrance, in which said second valve is provided with a cylindrical body being moveable coaxially within the cylindrical extending part of the poppet valve and the glans part having a larger diameter than the cylindrical body part, said glans part being positioned at the lower portion of the cylindrical body part.

2. The spray pump according to claim 1, wherein the top of the housing bottom entrance is formed to be concave in shape, and the bottom of the glans part of the second valve is formed to be convex in shape, enabling them to come into close contact with each other.

3. The spray pump according to claim 1, wherein a plurality of teeth are circumferentially formed on the outer surface of glans part of the second valve, and a plurality of grooves conformable to the teeth are circumferentially formed on the inner surface of the housing in proximity to the housing bottom entrance, and when the teeth are engaged to the grooves, a plurality of through passages are created between them.

4. The spray pump according to claim 1, wherein an annular protuberance is formed on the outer surface of cylindrical body of the second valve and/or the inner surface of cylindrical extending part of the poppet valve at the position where the cylindrical body is in sliding contact with the cylindrical extending part, resulting in an improved sealing effect.

5. The spray pump according to claim 1, wherein a pair of small lugs are formed on the outer surface of the body of the second valve at the height where the bottom of the extending part of the poppet valve is positioned immediately after spraying.

* * * * *